United States Patent [19]

Calderon

[11] 4,099,709

[45] Jul. 11, 1978

[54] METHOD AND APPARATUS FOR CONTROLLING EMISSIONS FROM OXYGEN STEELMAKING FURNACES

[76] Inventor: Albert Calderon, 1065 Melrose St., Bowling Green, Ohio 43402

[21] Appl. No.: 758,599

[22] Filed: Jan. 12, 1977

[51] Int. Cl.² ............................................. C21C 5/38
[52] U.S. Cl. .................................. 266/44; 98/115 R; 266/158
[58] Field of Search ........................ 266/158, 44, 159; 75/60; 98/115 R

[56] References Cited

U.S. PATENT DOCUMENTS

| | | | |
|---|---|---|---|
| 2,908,737 | 10/1959 | Dominicis | 266/158 X |
| 3,269,716 | 8/1966 | Walker | 266/158 |
| 3,863,906 | 2/1975 | Vicard | 266/158 |
| 3,918,691 | 11/1975 | Overmyer | 266/158 X |

Primary Examiner—Roy Lake
Assistant Examiner—Paul A. Bell

[57] ABSTRACT

This disclosure proposes an improved method of and apparatus for collecting the fumes of a furnace but in particular of a steelmaking furnace using the basic oxygen blowing process which furnace rotates about a trunnion arrangement. Especially this disclosure applies to an improved fume collecting method for an oxygen steelmaking furnace whose emissions take place during the charging of scrap, during the charging of molten iron, during blowing oxygen in the furnace, and during the sample and temperature taking. This fume collection is accomplished by providing a hood of multiple purpose design adapted to collect the emissions during any of the aforementioned portions of the steelmaking cycle, which can be retro-fitted to existing steelmaking facilities.

12 Claims, 4 Drawing Figures

METHOD AND APPARATUS FOR CONTROLLING EMISSIONS FROM OXYGEN STEELMAKING FURNACES

The present invention relates to an improved method of and apparatus for collecting the fumes from a steelmaking furnace which is rotatable about an axis and known in the art as "Oxygen Steelmaking Furnace."

More particularly, this invention relates to an improved method and apparatus as applied to fume collection systems located over the mouth of a steelmaking furnace using the open hood system which is now in use in great numbers.

In the art of steelmaking, the oxygen steelmaking furnace is generally serviced by charging the scrap and molten iron, by blowing oxygen on the charge, the taking of temperature and samples, and the tapping of the steel and slag.

During the charging of the scrap, the charging of molten iron, the blowing of oxygen and, the sample and temperature taking, a very serious pollution problem occurs. To correct this problem a hood is provided over the mouth of the furnace to collect the emissions. The collection of the emissions during blowing has been determined as successful by government authorities; however, the control of emissions during the charging of scrap and particularly during the charging of molten iron has not been satisfactory because great quantities of fumes and dirty flames are ejected from the mouth of the furnace into the building, and some fumes escape to the atmosphere. These polluting conditions cannot be withdrawn into the conventional hood whether it is of the open or closed type because the furnace is in its reclined position and the mouth thereof is not in registry with the point of entry of the hood. The hood is efficient in withdrawing emissions when the furnace is in its upright position but not in its reclined position to take the charge. In new installations auxilliary and canopy hoods attached to a bag-house, have been provided to catch these fugitive emissions at a cost of many millions of dollars, but despite this cost, no satisfactory solution has been found to retro-fit existing facilities which number around 25 to 30 steel plants in this country.

Attempts have been made to provide a sliding gate below the mouth of the hood, running on a track situated in the furnace aisle in order to constrict the mouth opening of the hood and increase the negative pressure at the hood towards the charging floor. This arrangement has not worked out well because of the position of the reclined furnace, the volume of the gas, the nonenvelopment of the iron ladle and the direction of the gases bellowing from the mouth of the furnace and the iron ladle.

The pesent invention is to eliminate the great expenditures needed for auxillary and canopy hooding but particularly this invention is suited for retro-fitting existing facilities to solve the pollution problems taking place not only during the blowing part as well as during the charging part of the cycle and its main objective is to provide an effective pollution control system to a rotatable furnace so that the fumes are collected when the furnace is reclined as well as when the furnace is upright.

Another object of this invention is to provide pollution control for an oxygen steelmaking furnace comprising a special hood with features constructed thereto so that emissions are controlled during charging and during blowing.

Further another object of this invention is to provide a combination hood having a centralized portion for blowing and a side extension towards the charging aisle to collect emissions during charging, said hood being equipped with gate means to selectively control the suction of gases from the central portion which is used during the blowing and the suction from the extending portion which is used during the charging Still another object of this invention is to make possible the registry of the mouth of the furnace with a first hood extension protruding towards the charging aisle of the steelmaking shop with gate means to block the entry of the hood portion used during blowing and make possible to cause an induced draft to pull the gases from the charging aisle during the charging of the scrap and the molten iron.

Yet another object of this invention is to provide a second hood extension protruding towards the charging aisle and mounted to said first hood extension, said second extension being preferably make-up of two sections and pivotally mounted in such a way as to form two halves and swing open away from said charging aisle for clearance purposes.

It is another object of the present invention to provide the said combination hood with a moveable skirt in order to minimize air infiltration into the central portion during blowing.

It is still another object of the present invention to provide a combination hood to take care of emissions during charging and blowing with gate means for selecting the direction of suction, said combination having an extension protruding towards the charging aisle adapted to envelope the ladle during the charging of molten iron.

It is yet another object of the instant invention to provide means for controlling the intake of the gases selectively depending upon the particular portion of the cycle such as charging and blowing and sample taking by gate means to control the draft, by the envelopment of the molten iron ladle and by charging of said molten iron in the absence of crane means.

It is further yet another object of this invention to provide gate means which are water cooled to selectively cause suction from a plurality of furnace mouth positions, said gate means being operated by external actuating means in order to eliminate the causing of damage thereto and the provision of a molten iron charging car instead of crane to effect the charging.

Other objects of this invention will appear in the following description and appended claims. Reference is made to the accompanying drawings forming a part of this specification and wherein reference characters designate corresponding parts in the several views.

Before exploring the present invention in detail, it is to be understood that the instant invention is not limited in its application to the details of construction and the arrangement of parts illustrated in the accompanying drawings since the invention is capable of other embodiments and of being practiced or carried out in various ways. Also it is to be understood that the phraseology or terminology employed herein is for the purpose of description and not limitation.

DETAILED DESCRIPTION OF DRAWINGS

Figure 2:
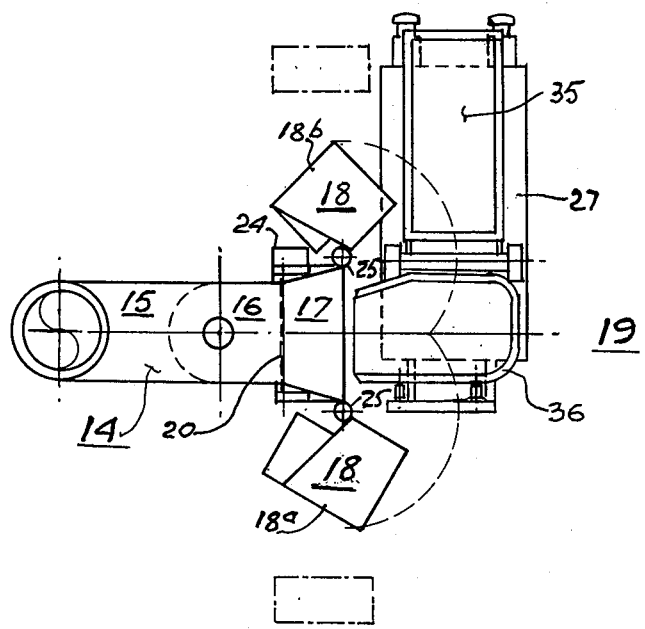
FIG. 2 is a plan view of FIG. 1 except that the crane, furnace and building structures are omitted for clarity.
Figure 1:
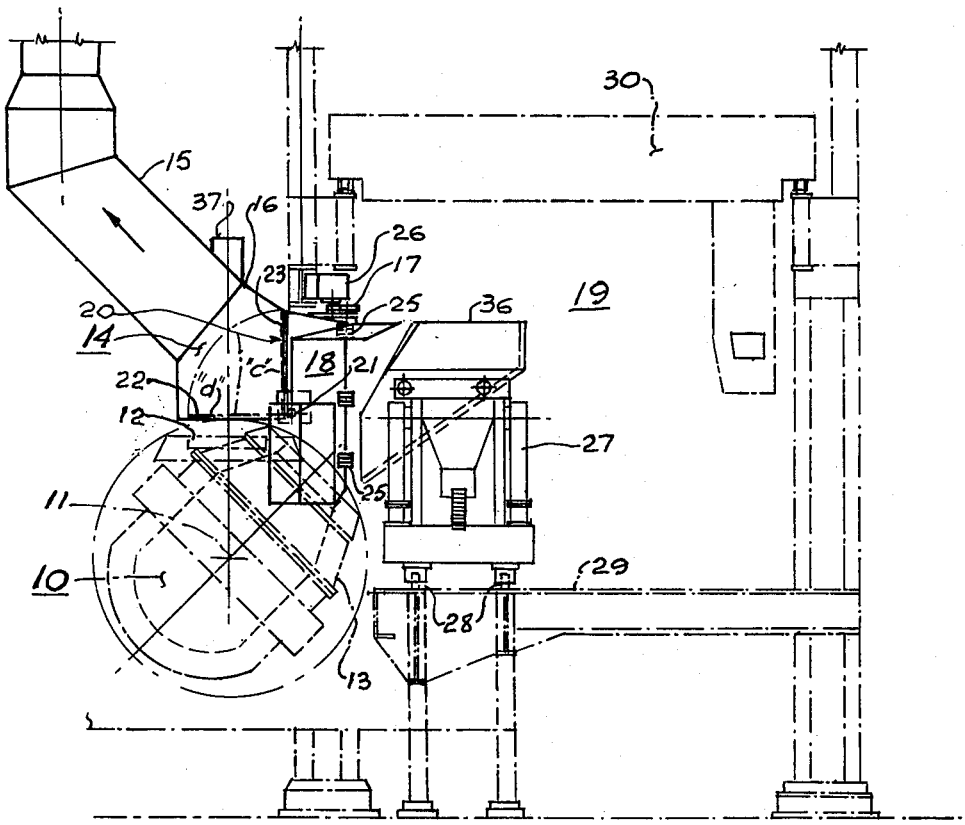
FIG. 1 shows a partial view taken cross-sectionally through a steelmaking shop using the basic oxygen steelmaking system. The furnace is shown in its entirety in phantom in the reclined position and in part in phantom in the upright position, the reclined position being for charging and the upright position for blowing; the invention is shown in solid with the pivoted sections of the hood extension opened to indicate travel clearances that must be maintained, and the machine for charging the scrap being in position at the furnace site.

In FIGS. 1 and 2, 10 indicates the basic oxygen furnace which possesses axis 11 about which it rotates; it also possesses drives to rotate it which drives are not shown in the drawing and which do not form a part of this invention. Furnace 10 which is refractory lined has mouth 12 and it is through this mouth that materials are charged such as scrap and molten iron; fumes and gases leave furnace 10 through mouth 12 during blowing. It is imperative to collect emissions from furnace 10 at all times but particularly to collect the emissions during the charging of scrap and molten iron while it is in reclined position 13. Hood 14 above furnace 10 is provided for the collection of emissions and it is tied to dust collection system (not shown) by means of interconnecting duct 15. Since mouth 12 is not in registry with hood 14 when furnace 10 is in the reclined position it is vital to provide effective suctions during such reclination. Therefore, hood 14 is made-up of a first section 16, a second section 17 and a third section 18 which in turn consists of two parts, 18-a and 18-b. Section 16 which is fixed, is located overhead mouth 12 while furnace 10 is in the upright position. Section 17 which is also fixed, extends towards charging aisle 19. Gate 20 is interposed between Sections 16 and 17 and is mounted on axis 21, and gate 20 is preferably rotated from the vertical position (shown in solid) to the horizontal position shown in phantom so that to selectively open or close openings 22 or 23, opening 22 being located over mouth 12 when furnace 10 is in the upright position and opening 23 being located between sections 16 and 17. In rotating gate 20 from the vertical position to the horizontal position, suction is changed from over furnace 10 when it is in the upright position to section 17 when furnace 10 is in the reclined position without loss of pressure drop. Drive 24 located exteriorally of hood 14 effects the rotation of gate 20. Section 18 having parts 18-a and 18-b are preferably pivotally mounted to sections 17 by means of pivots 25 in order to rotate parts 18-a and 18-b towards and away from charging aisle 19, this rotation being effected by drive 26. Section 18 is in the open position clearly shown by FIG. 2 to provide clearance along the length of aisle 19 for charging equipment such as scrap charging machine 27 which runs on rails 28 which rails are embedded in charging floor 29. Crane 30, show in phantom, is used as a service crane and not as a charging crane.

Figure 4:
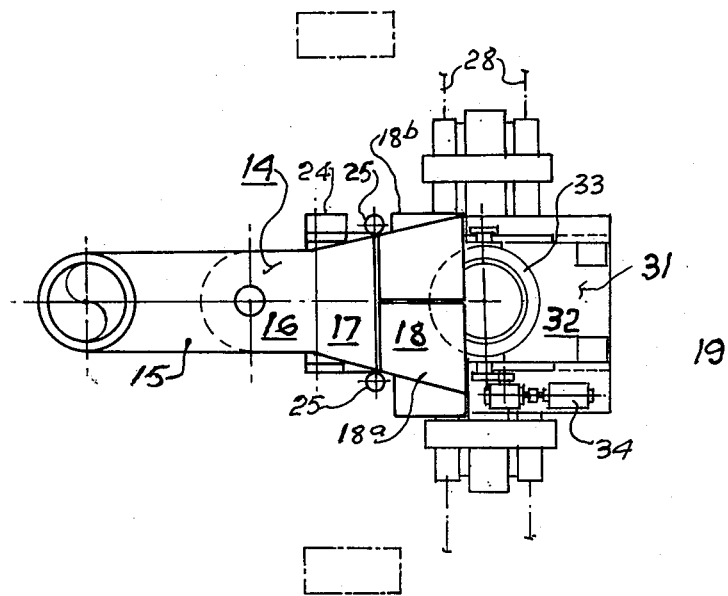
FIG. 4 is a plan view of FIG. 3, except that the crane, furnace and building structures have been obviated.
Figure 3:
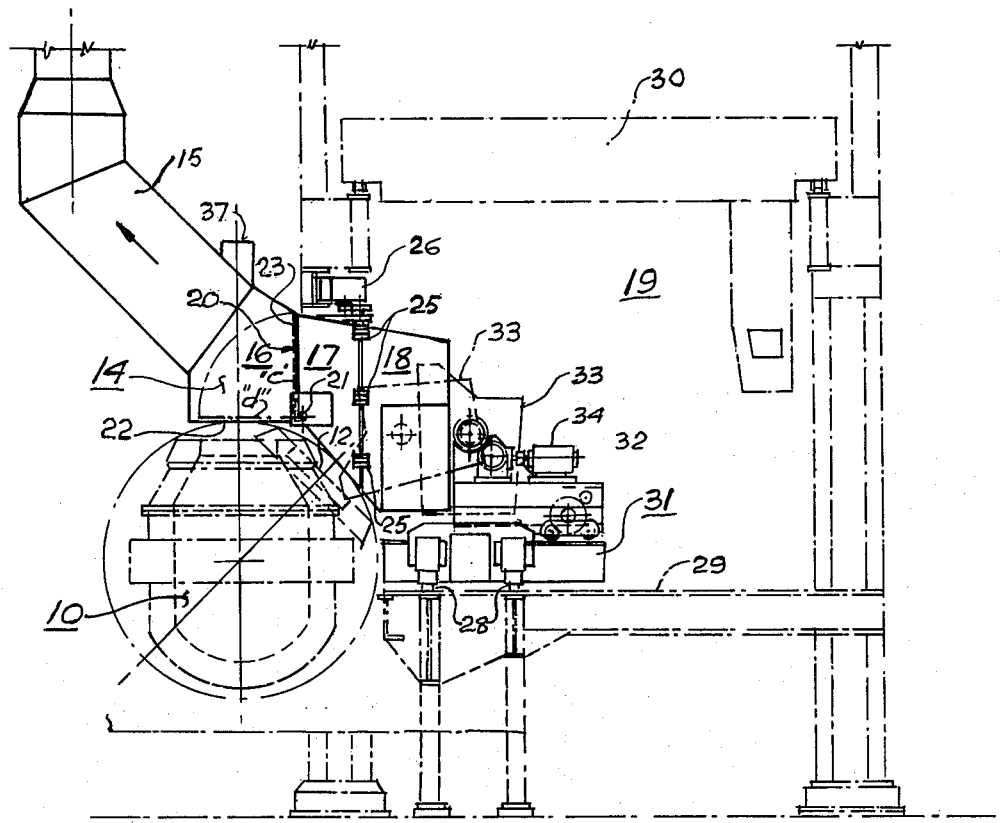
FIG. 3 shows a partial view taken cross-sectionally through a steelmaking shop using the basic oxygen steelmaking system. The furnace is shown in its entirety in phantom in the upright position and in part in phantom in the reclined position, the reclined position being used for charging and the upright position for blowing; the invention is shown in solid with the pivoted sections of the hood extension closed to indicate the envelopment of the ladle of molten iron that must be maintained to capture the fugitive emissions, the charging being effected by car rather than crane to provide proper approach and eliminate clearance problems encountered when charging with crane means.

Referring to FIGS. 3 and 4, hood 14 is shown with section 18 which is made-up of parts 18-a and 18-b, in the closed position to envelope the charging equipment such as molten iron charging car 31. Car 31 runs on rails 28 along the length of charging floor 29 and it possesses a transverse carriage 32 on which molten-iron ladle 33 is seated. Carriage 32 is adapted for movement towards and away from furnace 10 in order to provide the clearances for setting ladle 33 on carriage 32 and the movement of same towards mouth 12 of furnace 10 which in turn is partially shown in the reclined position in FIG. 3. Tilting mechanism 34 mounted on carriage 32 effects the rotation of ladle 33 in order to discharge molten metal into furnace 10 as shown by ladle 33 in the phantom position within hood extensions 17 and 18. Parts 18-a L and 18-b which possess overhead covers, fully envelope ladle 33 during the charging of molten metal into furnace mouth 12 and the lower ends of sections 17 and 18 circumscribe a full opening for furnace mouth 12. Since full suction is provided in section 16 caused by the rotation of gate 20 from position "c" to position "d" in order to create suction not above furnace 10 when it is in the upright position, but cause suction above mouth 12 when furnace 10 is in the reclined position while receiving the charge, emissions are effectively pulled into duct 15 from hood extension 17 and 18 where the emissions are generated.

While the operation of the method and apparatus of the present invention may be comprehended from a study of the foregoing description it is believed that the operation may be further explained as hereinafter set forth:

Operation

In operation the functions are explained as follows: Assuming that furnace 10 is empty and is in reclined position 13 in preparation for receiving the charge, scrap charging machine with box 35 filled with scrap travels from its parked position (not shown) to furnace 10 so that chute 36 is aligned with mouth 12. Gate 20 is lowered to horizontal position "d" from vertical position "c", and parts 18-a and 18-b of extension 18 are closed. In this manner suction is diverted from opening 22 to opening 23 of hood 14 and a negative draft is maintained within sections 16, 17 and 18 of hood 14. During the charging of the scrap gases are pulled from the envelope formed by sections 17 and 18 into interconnecting duct 15 and thence to the scrubber (not shown) for the treatment of the gas. At the conclusion of the scrap charging, parts 18-a and 18-b are rotated towards the furnace aisle in order to open the envelope and permit scrap charger 27 to move back to its parked position.

At this time charging car 31 is moved from its parked position (not shown) on rails 28 to register with furnace 10 for the charging of molten iron. Parts 18-a and 18-b of section 18 are closed as shown by FIG. 4 and ladle 33 is moved transversely towards furnace 10 by means of carriage 32. Ladle 33 is then tipped by tipping mechanism 34 so molten metal is poured into furnace 10 which is in its reclined position, through mouth 12. Gate 20 is kept in position "d" so that suction in the envelope formed by sections 17 and 18, is not diminished but is maintained, and the gases emanating from the mouth of the furnace in the reclined position, and the open top of the ladle are suched into inter-connection 15 efficiently without loss of pressure from entry point 22 of hood 14 because of gate 20 closing this entry point which is used during the blowing part of the cycle. At the conclusion of the molten iron charging, gate 20 is returned from "*d*" position to "*c*" position and furnace 10 is rotated upright so that mouth 12 is under section 16 with entry point 22 open and entry point 23 closed. An oxygen lance (not shown), is lowered into furnace 10 through hood entry point 37 and the blowing part of the cycle is initiated. Ladle 33 is returned from its tipped position to the upright position and moved away from furnace 10 by carriage 32 and parts 18-*a* and 18-*b* of hood extension 18 are opened in order to permit charging car 31 to move on rails 22 back to its parked position. During the blowing of the charge, crane 30 exchanges scrap box 35 for a full one on charging machine 27, and the same crane lifts ladle 33 from car 31 and takes it to the molten-iron ladling-station to fill it with molten iron; the full ladle is then replaced on charging car 31, and both machines 27 and 31 are ready for the following cycle.

At the conclusion of the blowing part of the cycle furnace 10 is moved to its reclined position for sample and temperature taking. At this juncture gate 20 is moved from position "*c*" to "*d*" and parts 18-*a* and 18-*b* of hood extension 18 are closed so that emissions escaping from mouth 12 of furnace 10 in the reclined position are also effectively sucked into section 15 even though furnace 10 is in its reclined position. It is to be noted that an adaption to this invention may be incorporated to also suck the gases during tapping by providing a second gate similar to 20 on the furnace side opposite the charging aisle with hood extension similar to 17 and 18 which could collect emissions during tapping. It is also envisioned to drop side skirts to sections 16 and 17 all the way to the ground in order to collect emissions from slagging.

Further in new installations the position of rails 28 may be located at such a distance on the charging floor as to obviate the necessity of making section 18 in parts and not need the feature of pivot mounting to result in sections 17 and 18 in one composite structure. This, of course, would necessitate to mount chute 36 of scrap charger 27 to move on a carriage in order to reach the mouth of the furnace.

All in all it is submitted that the present invention provides a new and novel method and apparatus for controlling emissions from rotatable steelmaking furnaces. While preferred embodiments of the present invention have been illustrated and described in considerable detail, the invention is not to be considered limited to the precise mode of construction shown. It is intended to cover hereby all adaptions, modifications and use of the invention which come within the scope of the appended claims.

I claim:

1. In the method of controlling emissions from a basic oxygen steelmaking furnace wherein oxygen is blown onto a charge of metal while the furnace is in a generally upright position with its mouth facing upwardly, and wherein the furnace is rotated to one side of the upright position to bring the mouth to a reclined position on the one side of the upright position for performing certain operations, the improvement comprising the steps of positioning a hood with a first exhaust opening facing the mouth of the furnace while the furnace is in the upright position, providing a second exhaust opening in the hood facing the side of the upright position to which the furnace mouth is rotatable, connecting a source of suction with the hood, providing gate means selectively positionable either in a first position closing the second exhaust opening and establishing communication of the first exhaust opening with the source of suction or a second position closing the first exhaust opening and establishing communication of the second exhaust opening with the source of suction, and selectively positioning the gate member in either the first position or the second position.

2. The method as defined in claim 1 including the further step of providing a hood portion extending toward the side of the furnace to which the mouth of the furnace is rotated for covering the mouth of the furnace when the furnace mouth is in the reclined position.

3. The method as set forth in claim 2 wherein the step of providing a hood extension includes the step of disposing the hood extension to envelop charging equipment in order to admit the gases created during charging through the furnace opening and into said hood.

4. The method as set forth in claim 3 including the step of selectively moving a portion of said hood extension to permit travel of charging equipment toward and away from said oxygen steelmaking furnace.

5. Apparatus for controlling emissions from a basic oxygen steelmaking furnace wherein oxygen is blown onto a charge of metal while the furnace is in a generally upright position with its mouth facing upwardly, and wherein the furnace is rotated to one side of the upright position to bring the mouth to a reclined position on the one side of the upright position for performing certain operations, said apparatus comprising a hood having a first exhaust opening facing the mouth of the furnace while the furnace is in the upright position, said hood including a second exhaust opening facing the side of the upright position to which the furnace mouth is rotatable to, a source of suction connected with said hood, gate means selectively positionable either in a first position closing the second exhaust opening and establishing communication of the first exhaust opening with the source of suction or a second position closing the first exhaust opening and establishing communication of the second exhaust opening with the source of suction.

6. Apparatus as defined in claim 5 further including a hood extension portion extending toward the side of the furnace to which the mouth of the furnace is rotated for covering the mouth of the furnace when the furnace mouth is in the reclined position.

7. The apparatus as set forth in claim 5 wherein said gate means comprises a pivotally supported gate member, and a drive means to effect the control of the position of said gate member in said first or second position for controlling the admission of gases through said first and second exhaust openings.

8. The apparatus as defined in claim 7 wherein said first exhaust opening extends transverse to said second exhaust opening.

9. The apparatus as defined in claim 7 wherein said hood comprises longitudinally extending wall means forming a conduit with said first exhaust opening at a longitudinal end thereof, said second exhaust opening being formed in said longitudinally extending wall means and extending transverse to said first exhaust opening.

10. The apparatus as set forth in claim 6 wherein said hood extension includes portions which envelope charging equipment during charging of said furnace in order to confine the gases created during charging and the suction of said gases through said second exhaust opening and into said hood.

11. The apparatus as set forth in claim 10 wherein part of said hood extension is moveable with respect to said furnace to provide clearance for the travel of charging equipment toward and away from the furnace.

12. The apparatus as set forth in claim 10 wherein said extension includes two sections pivotally mounted on parallel axes and rotatable in opposite directions to provide clearance for travel of said charging equipment.

* * * * *